June 16, 1925.
T. M. ROGERS
FISHING TOOL
Filed May 17, 1924
1,542,099
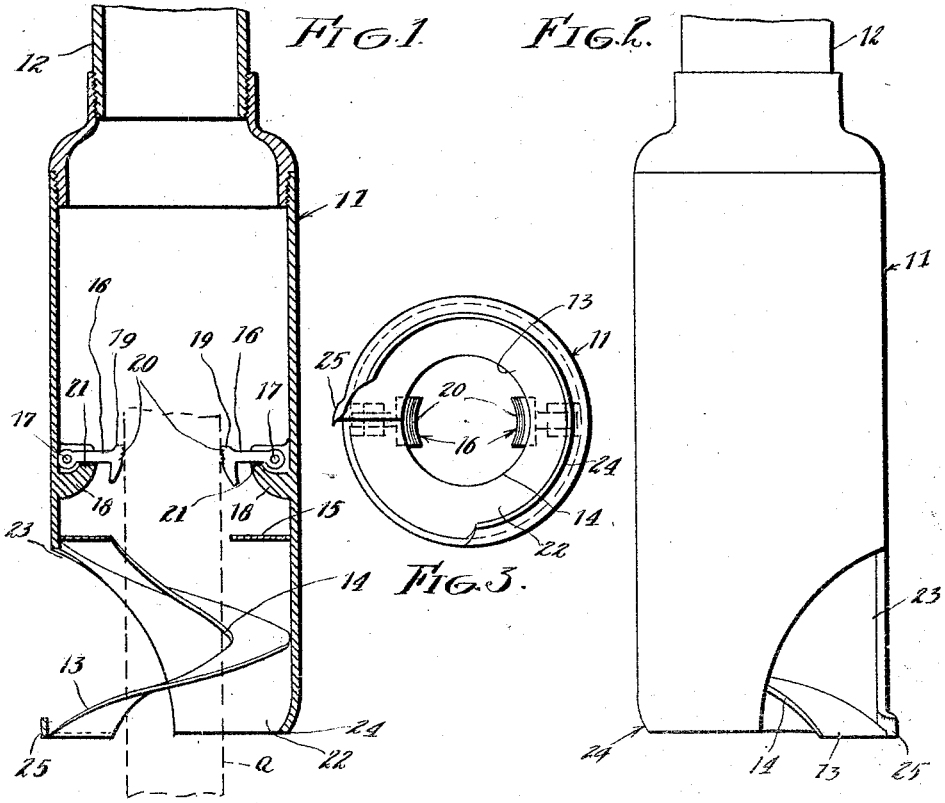
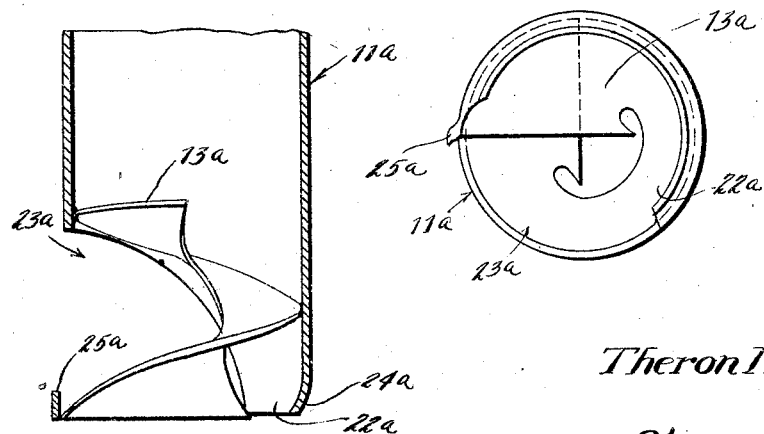

Patented June 16, 1925.

1,542,099

UNITED STATES PATENT OFFICE.

THERON M. ROGERS, OF FELLOWS, CALIFORNIA.

FISHING TOOL.

Application filed May 17, 1924. Serial No. 713,999.

*To all whom it may concern:*

Be it known that I, THERON M. ROGERS, a citizen of the United States, residing at Fellows, in the county of Kern and State of California, have invented a new and useful Fishing Tool, of which the following is a specification.

This invention relates to fishing tools, a term given to tools employed for lowering into wells to pick up broken pieces of pipe, tools, etc., and pulling them out of the well. It often happens that comparatively small pieces of drills and other tools lodged in the well, interfere with the drilling operation, thus making it imperative that they be removed. With fishing tools of prior construction it is usually impossible, or at least quite difficult, to catch hold of the small pieces of tools, pipe, etc., for the reason that they often lodge against the wall of the hole that is being drilled or against the inner face of the casing.

An object of this invention is to make provision for guiding the fish toward the axis of the fishing tool so that said tool will become effective to grapple the fish. "Fish" is the term generally applied in this art to the object that is to be retrieved from the hole by the tool.

The accompanying drawings illustrate the invention:

Fig. 1 is a longitudinal section of a fishing tool constructed in accordance with the provisions of this invention, a fish being indicated in broken lines within the tool, and a fragment of the tubing for operating the tool also being shown.

Fig. 2 is a side elevation of the tool shown in Fig. 1.

Fig. 3 is a view looking at the lower end of the tool.

Fig. 4 is a fragmental view of a modified form of the tool.

Fig. 5 is a bottom end view of the tool shown in Fig. 4.

Referring first to the form of the invention disclosed in Figs. 1, 2 and 3, there is provided a bell 11 to which is connected the tubing 12 by which the tool is lowered into and raised from the well. The term bell employed herein refers to any suitable tubular member. The bell is provided in its interior with a helical track or a guide 13, said guide preferably making at least one full turn. A central bore 14 extends through the guide 13 so as to accommodate long tubular or cylindrical pieces of pipe, indicated in broken lines at *a* in Fig. 1. The upper end of the guide 13 terminates in an approximately flat shelf 15.

The construction described may be employed without any further features, if desired, but in some instances it is of advantage to employ dogs above the shelf 15 for gripping large objects, such as pieces of pipe for example, that may be taken into the bell 11 thus to insure against said objects passing out of the tool through the bore 14. Such dogs are indicated at 16, being pivoted at 17 to brackets 18 projecting from the inner face of the bell 11. These dogs 16 have curved fish-engaging faces 19 and said faces are preferably serrated as indicated at 20. Downward swinging of the dogs 16 is limited by stops 21 formed by shoulders on the brackets 18. When the dogs 16 engage the shoulders 21, said dogs are substantially horizontal and the faces 19 upright, as in Fig. 1.

Not only is the bottom end of the bell open, as indicated at 22 but, preferably, the side of the bell has an opening 23 therein registering with the lower portion of the guide 13.

The lower end of the bell preferably has an inturned edge 24 that extends from one margin of the opening 23 almost to the opposite margin of said opening, at which opposite margin there is provided an outturned blade 25 which registers with the lower end of the guide 13, as clearly shown in Fig. 2. The blade 25 and guide 13 project slightly below the level of the edge 24 of the bell.

To effect a fishing operation with the tool above described, said tool will be lowered into the well and, when in the judgment of the operator, the tool is adjacent to the fish that is to be gripped, he effects rotation (in this instance right-hand) of the tool to bring the opening 23 and the lower end of the guide 13 into juxtaposition with the upper end of the fish. If the fish lies against the inner face of the hole or casing, the blade 25 will wedge between the fish and said face and force the fish outwardly and into the opening 23. Further rotation of the tool will then cause the guide 13 to pass downwardly in a helical path beneath the fish, if said fish is comparatively small, until said fish is deposited upon the shelf 15. If the fish is a comparatively long cylindrical piece, like that indicated at $a$ in Fig. 1, said fish will be caused to shift into axial alinement with the bore 14 and pass upwardly through said bore until the upper end of the fish engages and swings upwardly the dogs 16. The tool will then be raised and the weight of the fish, if it is gripped by the dogs 16, will cause the fish to be wedged tightly between said dogs, as in Fig. 1. The bell will then be raised to the surface of the earth.

In the modified form of the invention disclosed in Figs. 4 and 5, the bell is fragmentarily indicated at $11^a$, the guide at $13^a$, the bottom opening at $22^a$ and the side opening at $23^a$. The guide $13^a$ does not have a bore extending therethrough as is the case with the guide 13 but is of a width as great as the radius of the bell $11^a$. In this particular instance the width of the guide $13^a$ is greater than the radius of the bell and the pitch of the helix and widths of the openings $22^a$, $23^a$ are fully as great as the width of a rotary disc bit so that such bit can enter the opening $23^a$ and the bell be rotated to cause the guide to move beneath the rotary disc bit to cause said rotary disc bit to move upwardly into the bell.

I claim:

1. A fishing tool comprising a bell open at its lower end, and a helical track in the bell extending to the lower end thereof.

2. A fishing tool comprising a bell open at its lower end, and a helical track in the bell extending to the lower end thereof, there being an opening in the side of the bell adjacent to the lower portion of the track.

3. A fishing tool comprising a bell open at its lower end, a helical track in the bell extending to the lower end thereof, there being an opening in the side of the bell adjacent to the lower portion of the track, and an outwardly projecting blade on one of the marginal portions of the side opening.

4. A fishing tool comprising a bell open at its lower end, and a helical track in the bell extending to the lower end thereof, the rim of the bell having an in-turned portion.

5. A fishing tool comprising a bell open at its lower end, a helical track in the bell extending to the lower end thereof, the side of the bell having an opening adjacent to the lower portion of the track and the rim of the bell having an in-turned portion, and an outwardly projecting blade on one side of the marginal portions of the side opening.

6. A fishing tool comprising a bell open at its lower end, and a helical track in the bell extending to the lower end thereof of no less width than the radius of the bell, the side of the bell having an opening adjacent to the lower portion of the track of a height as great as the radius of the bell.

7. A fishing tool comprising a bell open at its lower end, and a helical track in the bell extending to the lower end thereof of a greater width than the radius of the bell, the side of the bell having an opening adjacent to the lower portion of the track of a height greater than the radius of the bell.

Signed at Fellows, Kern Co., this 28th day of April, 1924.

THERON M. ROGERS.